March 3, 1970  R. C. BUELER  3,498,681
CONTROL VALVE
Filed May 15, 1967  2 Sheets-Sheet 1
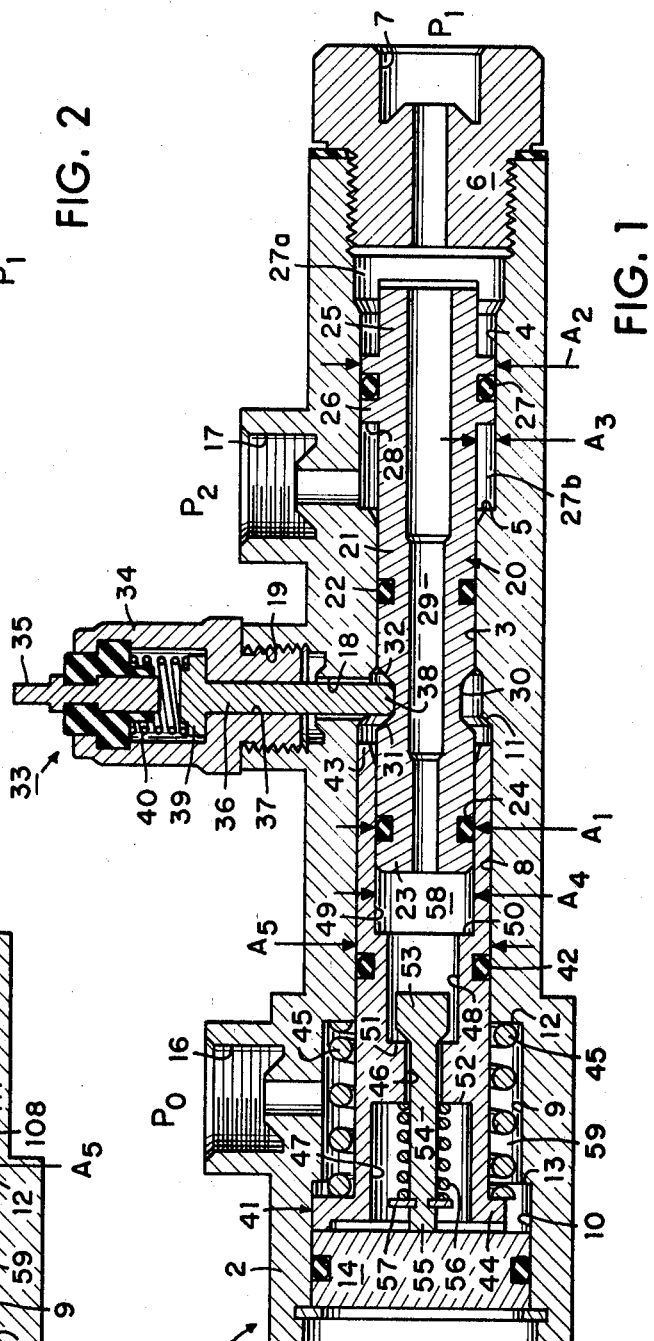
FIG. 1
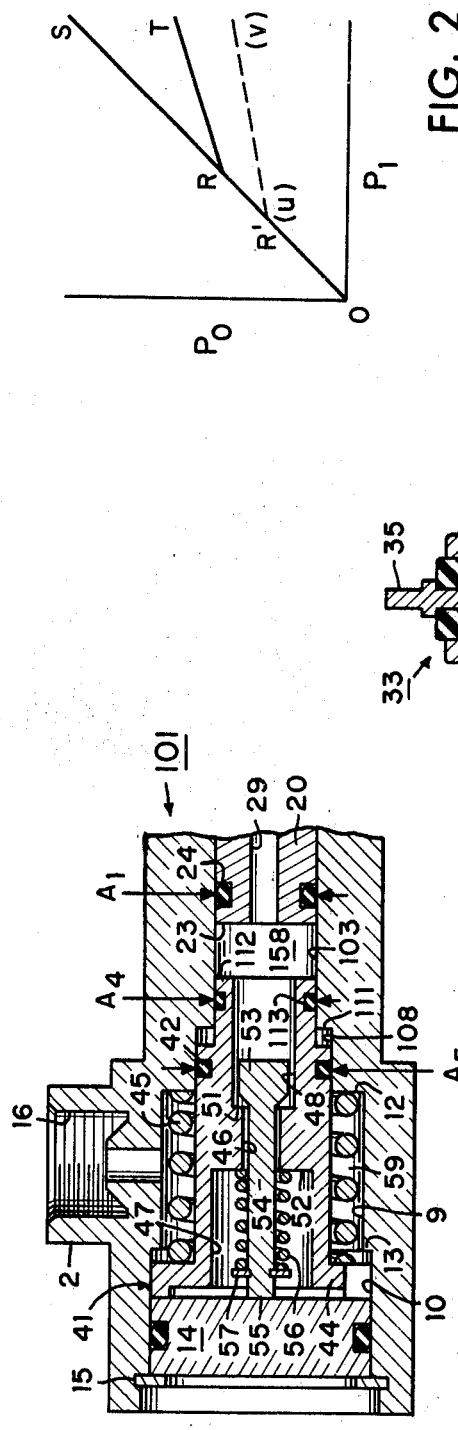
FIG. 2
FIG. 3
INVENTOR
RICHARD C. BUELER
BY
*Joseph E. Papin*

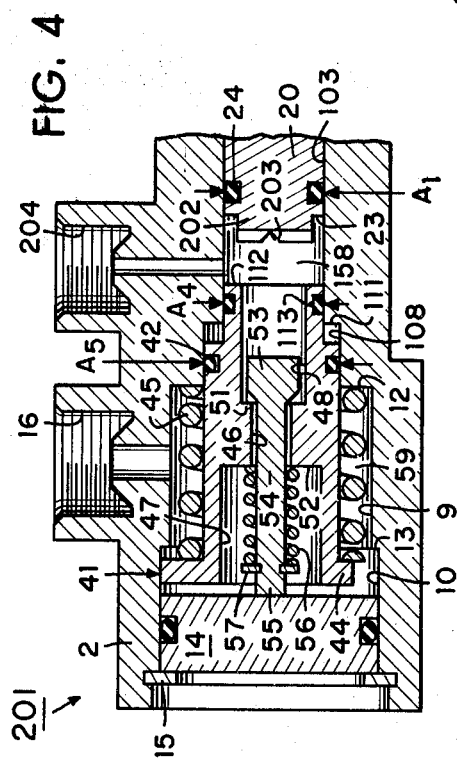

United States Patent Office 3,498,681
Patented Mar. 3, 1970

3,498,681
CONTROL VALVE
Richard C. Bueler, Glendale, Mo., assignor, by mesne assignments, to Wagner Electric Corporation, South Bend, Ind., a corporation of Delaware
Filed May 15, 1967, Ser. No. 638,237
Int. Cl. B60t 8/26, 17/22
U.S. Cl. 303—6                                                31 Claims

ABSTRACT OF THE DISCLOSURE

A control valve including a proportioning portion for effecting a metered application through said control valve of a fluid pressure supplied thereto, and a control portion responsive to a predetermined differential between said supplied fluid pressure and another fluid pressure separately supplied to said control valve to disable said proportioning means and thereby effect an unmetered application of the first named supplied fluid pressure through said control valve.

---

This invention relates in general to dual fluid pressure systems and in particular to control valves for controlling pressure fluid flow through one of said dual systems.

In the past, dual fluid pressure systems were provided with a control or driver warning valve which was responsive to a fluid pressure failure in one of the dual systems to light a driver warning or dash lamp and also with another control or proportioning valve which proportioned the fluid pressure in one of the dual systems delivered to one vehicle brake set. One of the disadvantageous or undesirable features of such past constructions was that the driver warning valves and proportioning valves were separate units, which not only affected the cost of manufacturing but also the cost of assembly, both of the valves per se and on the vehicle, and the utilization of such separate valve units also presented a space factor problem since under-the-hood space in modern vehicles is becoming critical. Another of the disadvantageous or undesirable features of such past constructions was that the proportioning valve continued to proportion the fluid pressure applied to the one vehicle brake set even though a failure had occurred in the portion of the dual system connected with the other vehicle brake set.

The primary object of the present invention is to provide a control valve which overcomes the aforementioned disadvantageous or undersirable features, and this, as well as other objects and advantageous features of the present invention, will become apparent hereinafter.

In the drawings wherein like numerals refer to like parts wherever they occur:

FIG. 1 is a sectional view showing a control valve embodying the present invention in cross-section, FIG. 2 is a graphical representation illustrating the output pressure effected by the control valve of FIG. 1 in response to the input pressure supplied thereto, FIG. 3 is a fragmentary view of the control valve of FIG. 1 showing an alternative construction in cross-section and also embodying the present invention, FIG. 4 is a fragmentary view of the control valve of FIG. 3 showing another alternative construction also embodying the present invention, and FIG. 5 is a sectional view of another control valve embodying the present invention in cross-section.

Briefly, one aspect of the present invention comprises a control valve having means for controlling the application therethrough of a supplied fluid pressure, and other means responsive to a predetermined differential between the first named supplied fluid pressure and another separately supplied fluid pressure respectively acting thereon for disabling said first named means to obviate the controlling effect thereof on the first named supplied fluid pressure applied through said control valve.

Referring now to FIG. 1, a control valve, indicated generally at 1, is provided with a housing 2 having a bore 3 connected at one end with a counterbore 4 and defining a shoulder 5 therebetween, said counterbore being relieved at its rightward end to threadedly receive a closure member end plug 6 having an inlet port 7 therein connecting with said counterbore. The inlet port 7 is adapted to be connected with one fluid pressure generating chamber of a dual or split master cylinder (not shown) of a type well known in the art. The other end of the housing bore 3 is connected with stepped counterbores 8, 9 and 10 having shoulders 11, 12 and 13 defined therebetween, and a closure member or end plug 14 is maintained in the counterbore 10 against displacement by a snap ring and groove assembly 15. An outlet or delivery port 16, which is adapted for connection with one vehicle brake set (not shown), is provided in the housing 2 connecting with the counterbore 9 adjacent the mid-portion thereof, and another inlet port 17, which is adapted for connection with the other fluid pressure generating chamber of the aforementioned split or dual master cylinder and also with the other vehicle brake set (not shown), is provided in said housing intersecting with the counterbore 4 adjacent the housing shoulder 5. A cross-bore 18 is also provided in the housing 2 having one end intersecting with the housing bore 3 and the other end thereof connecting with a threaded electrical switch receiving cross-counterbore 19.

A switch actuating member or piston, indicated generally at 20, is shown in its normal operating or centered position having a body portion 21 including a peripheral seal 22 slidably received in the housing bore 3 between the housing shoulder 5 and the cross-bore 18. The leftward or free end 23 of the piston body 21 is provided with a peripheral seal 24 and extends coaxially into the housing counterbore 8, said leftward end defining an effective fluid pressure responsive area $A_1$, as discussed hereinafter. The rightward or free end 25 of the piston body 21 extends coaxially into the housing counterbore 4 defining a radially extending flange 26 slidably received in said counterbore between the inlet ports 7, 17 and having a peripheral seal 27 herein, said flange dividing said counterbore into opposed inlet chambers 27a, 27b respectively connected with said inlet ports 7, 17. The piston body opposed end 25 and flange 26 define an effective area $A_2$ for subjection to fluid pressure supplied to the inlet port 7, and an annular shoulder 28 is provided on the flange 26 in opposed relation to the piston body free end 25 defining an effective area $A_3$ for subjection to fluid pressure supplied to the inlet port 17. It should be noted that the areas $A_1$, $A_3$ are additive and opposed to the area $A_2$ and that the area $A_3$ is substantially equal to the difference between the areas $A_1$, $A_2$. A passage 29 is axially provided through the piston body 21 between the opposed free ends 23, 25 thereof, and a peripheral groove 30 is provided in said piston body between the seals 22, 24 having opposed side walls or cam surfaces 31, 32 inclined at predetermined angles with the axis of said piston body.

An electrical switch, indicated generally at 33, includes a conductive closure or plug member 34 threadedly received in the housing cross-counterbore 19, and a metal terminal 35 extends through said plug member and is insulated therefrom, said terminal having an exterior end for connection with an electrical circuit of a type well known in the art for selectively energizing a driver warning or dash lamp (not shown). A conductive switch member 36 is slidably received in a bore 37 provided in the switch closure member 34 and in electrical contact or conductive engagement therewith, said switch member having a follower end portion 38 extending through the housing cross-bore 18 into following engagement with the peripheral groove 30 of the piston body 21 in the housing bore 3 and having an upper end portion 39 defining a contact for electrical contact or conductive engagement with the interior end of the terminal 35. A spring 40 of predetermined compressive force urges the contact 39 away from the interior end of the terminal 35 and urges the switch member follower end 38 into positioning engagement with the piston body peripheral groove 30. It should be noted that the compressive force of the spring 40 is predetermined at a value great enough to substantially maintain the piston body 21 in its centered position and prevent shifting movement thereof when taken in conjunction with the force also opposing such shifting movement of the switch member follower end 38 being moved up the inclined peripheral groove surfaces 31, 32, respectively.

A control or proportioning member, such as a metering piston, indicated generally at 41, is slidable in the housing counterbore 8 and provided with a peripheral seal 42 in sealing engagement therebetween, and the rightward end 43 of said metering piston defines an abutment for displacement limiting engagement with the housing shoulder 11. The metering piston 41 extends coaxially through the counterbore 9 having a radially extending spring retainer or slotted flange 44 defining the leftward or free end thereof which is slidable in the housing bore 10 between the housing shoulder 13 and closure member 14, said flange being normally urged toward an inoperative or disabled position into abutment with said closure member by the compressive force of a proportioning or metering spring 45 interposed between said flange and the housing shoulder 12. The metering piston 41 is provided with an axial bore 46 interposed between a counterbore 47 and opposed stepped counterbores 48, 49, and an annular shoulder 50 is provided between said stepped counterbores for abutment with the leftward end 23 of the switch piston 20 which is slidably received in the stepped counterbore 49. An annular shoulder or valve seat 51 is defined in the metering piston 41 at the juncture of the piston bore 46 and stepped counterbore 48, and an opposing shoulder 52 is also defined in said metering piston at the juncture of said piston bore and counterbore 47. A valve member or element 53 is provided for sealing engagement with the valve seat 51 having a stem or guide portion 54 which extends coaxially through the metering piston bore and counterbore 46, 47, and the leftward or abutment end 55 of said stem portion is normally positioned in abutting engagement with the housing closure member 14 to predeterminately space said valve member from said valve seat. A valve spring 56 of negligible compressive force is biased between the metering piston shoulder 51 and a retainer 57 provided on the valve stem 54 urging the stem abutment end 55 toward engagement with the housing closure member 14 and urging the valve head 53 toward engagement with the metering piston valve seat 51.

Another inlet or intermediate chamber 58 is defined in the metering piston stepped counterbores 48, 49 between the metering piston shoulder 51 and the leftward end 23 of the switch piston 20 being connected with the inlet chamber 27a by the switch piston passage 29, and it is obvious that the portion of said metering piston subjected to fluid pressure in said chamber defines an effective area $A_4$ which is substantially equal to the area $A_1$ of said switch piston. An outlet chamber 59 is also defined in the housing counterbores 9, 10 between the housing shoulder 13 and closure member 14, said outlet chamber being connected in open pressure fluid communication with the outlet port 16 and also being connected with the chamber 58 through the metering piston bore and counterbore 46, 47. Another effective area $A_5$, which is substantially equal to the area $A_2$ of the switch piston 20, is provided on the metering piston 41 in opposed relation to the area $A_4$ thereof and is substantially defined by the sealing engagement of the metering piston seal 42 with the housing counterbore 8, said area $A_5$ being subjected to fluid pressure in the outlet chamber 59 and being predeterminately greater than its opposing area $A_4$. To complete the description of the control valve 1, it should be noted that the valve head 53 is normally disengaged from the metering piston valve seat 51 and that the housing counterbore 4, the switch piston passage 29, the metering piston bore 46 and counterbores 47, 48, 49, and the housing counterbores 9, 10 define a pressure fluid flow passage through said control valve between the inlet and outlet ports 7, 16.

In the operation with the component parts of the control valve 1 positioned as shown in the drawings and as described hereinabove, independent or separately supplied input fluid pressures $P_1$, $P_2$ normally having substantially equal magnitudes are supplied upon operator actuation of the split master cylinder (not shown) to the inlet ports 7, 17, respectively, of the control valve 1. The input fluid pressure $P_2$ flows from the inlet port 17 into the chamber 27b acting on the switch piston area $A_3$ to establish a force $P_2$, $A_3$, and the input fluid pressure $P_1$ flows from the inlet port 7 into the inlet chamber 27a and through the switch piston passage 29 into the intermediate chamber 58 to establish forces $P_1$, $A_2$ and $P_1$, $A_1$ which are opposed to and additive to the force $P_2$, $A_3$, respectively. Since the area $A_3$ has been previously defined as substantially equal to the difference between the areas $A_1$, $A_2$ and since the input fluid pressures $P_1$, $P_2$ have been previously defined as substantially equal, it is obvious that the force $P_2$, $A_3$ is substantially equal and opposite to the difference between forces $P_1$, $A_2$ and $P_1$, $A_1$; therefore, the switch piston 20 is relatively unaffected by the input fluid pressures $P_1$, $P_2$ acting thereon and will remain substantially in its centered position. The input fluid pressure $P_1$ is applied from the intermediate chamber 58 through the metering piston bore 46 into the outlet chamber 59 and therefrom to the outlet port 16 to establish an output fluid pressure $P_0$. The input fluid pressure $P_1$ acts on the input effective area $A_4$ of the metering piston 41 to establish an input force $P_1$, $A_4$, and the output fluid pressure $P_0$ acts on the effective area $A_5$ of said metering piston to establish an output force $P_0$, $A_5$ opposed to the input force $P_1$, $A_4$. Since the input and output fluid pressures $P_1$ and $P_0$ are initially equal and since the area $A_5$ is greater than the area $A_4$ of the metering piston, it is obvious that the output force $P_0$, $A_5$ is greater than the input force $P_1$, $A_4$; however, the compressive force Fc of the metering spring 45 prevents movement of the metering piston 41 until the input and output fluid pressures $P_1$, $P_0$ exceed a predetermined value, as shown by the line OR in the graphical representation of FIG. 2. When the predetermined value R of the input and output fluid pressures $P_1$, $P_0$ is attained, the output force $P_0$, $A_5$ overcomes the additive input and spring forces $P_1$, $A_4$, Fc to move the metering piston 41 from its disabled position in a rightward direction toward an operative position to store the energy of the spring 45. This rightward movement of the metering piston 41 initially engages the valve seat 51 thereof with the valve element 53 to isolate the input fluid pressure $P_1$ from the output fluid pressure $P_0$ and disengages the valve stem abutment from the housing closure member 14.

From the graphical representation in FIG. 2, it is obvious that increases in the magnitude of the input pressure $P_1$ in excess of the predetermined value R, as shown by the line RS, will result in proportionally reduced increases in the output pressure $P_0$, as shown by the line RT. For instance, when the input fluid pressure $P_1$ is increased to a value in excess of the predetermined value R, the input force $P_1$, $A_4$ is correspondingly increased and additive to the spring force $Fc$ to overcome the output force $P_0$, $A_5$; therefore, the metering piston 41 is moved leftwardly toward a metering position initially engaging the valve stem abutment 55 with the housing closure member 14 and thereafter disengaging the valve seat 51 from the valve member 53 to effect a metered application of the increased input fluid pressure $P_1$ through the metering piston bore 46 and the outlet chamber 59 to the outlet port 16 to effect a proportional or ratioed increase in the output fluid pressure $P_0$, as shown by the line RT in the graph of FIG. 2, wherein $$P_o = \frac{P_1 A_4 + Fc}{A_5}$$

Of course, the increased output fluid pressure $P_0$ effects a corresponding increase in the output force $P_0$, $A_5$ and when the increased output force $P_0$, $A_5$ attains an increased value substantially equal to that of the increased input force $P_1$, $A_4$ and the additive spring force $Fc$, the metering piston 41 is again moved rightwardly engaging the valve seat 51 thereof with the valve member 53 to again isolate the increased input and output fluid pressures $P_1$, $P_0$ and thereafter disengage the valve stem abutment 55 from the housing closure member 14. It is, of course, obvious that the metering piston 41 will be responsive to further increases in the input fluid pressure $P_1$ to effect further corresponding proportional increases in the output fluid pressure $P_0$ in the same manner as previously described, and it should also be noted that as the input fluid pressure $P_1$ is increased, the separate input fluid pressure $P_2$ is also equally increased to maintain the additive forces $P_2$, $A_3$ and $P_1$, $A_1$ substantially equal to the opposing force $P_1$, $A_2$ on the switch piston 20 obviating displacement movement thereon from its centered position.

When the split master cylinder is deactuated, the input fluid pressures $P_1$, $P_2$ are vented to atmosphere which eliminates the forces $P_1$, $A_1$, $P_2$, $A_2$ and $P_2$, $A_3$ acting in the switch piston 20, as well as the input force $P_1$, $A_4$ acting in the metering piston 41, and the output fluid pressure $P_0$ acting on the effective area of the valve member 53 moves said valve member against its spring 56 toward an open position disengaged from the valve seat 51. In this manner, the applied or output fluid pressure $P_0$ is eliminated or vented from the outlet port 16 through the outlet chamber 59, the metering piston bore 46, the intermediate chamber 58, the switch piston passage 29, and the inlet chamber 27a to the inlet port 7. Upon the elimination of the output fluid pressure $P_0$ and, of course, the output force $P_0$, $A_5$ as above described, the compressive force $Fc$ of the metering spring 45 will return the metering piston 41 and valve 53 to their original or disabled positions.

In the event that a sustained differential is established between the separately supplied fluid pressures $P_1$, $P_2$ due to a malfunction of the split master cylinder, leaks or the like, wherein the magnitude of the supplied fluid pressure $P_1$ exceeds that of the supplied fluid pressure $P_2$ by a predetermined value, the force $P_1$, $A_2$ acting on the switch piston 20 will, of course, overcome the opposing forces $P_1$, $A_1$, $P_2$, $A_2$ acting thereon and displaces said switch piston from its centered position leftwardly toward its leftward displaced position since the reduction of the input fluid pressure $P_2$ effects a corresponding reduction in the force $P_2$, $A_2$. When the metering piston 41 is in its disabled position, as shown in FIG. 1, this leftward displacement movement of the switch piston 20 moves the leftward end 23 thereof into displacement limiting or abutting engagement with the metering piston shoulder 50 which defines the leftward displaced position of said switch piston. The leftward displacement movement of the switch piston 20 also moves the cam surface 32 thereof leftwardly toward a position driving the switch member 36 upwardly thereon against the compressive force of the switch spring 40 to engage the contact 39 with the interior end of the terminal 35 and, in this manner, effect the completion of the electrical circuit (not shown) for energizing a driver warning or dash lamp.

If the metering piston 41 is in its isolating operative position isolating the input fluid pressure $P_1$ from the output fluid pressure $P_0$ or in its metering position effecting a metered increase in the output fluid pressure $P_0$, as previously described, the leftward displacement movement of the switch piston 20 in response to the predetermined differential between the input fluid pressures $P_1$, $P_2$ will engage the switch piston leftward end 23 with the metering piston shoulder 50 and thereafter concertedly drive said metering piston 41 leftwardly against the output force $P_0$, $P_5$ toward its disabled position wherein the metering piston flange 44 and the valve stem abutment 55 are engaged with the housing closure member 14 to disengage the valve member 53 from the metering piston valve seat 51 and effect an unmetered application of the supplied fluid pressure $P_1$ through the metering piston bore 46 and the outlet chamber 59 to the outlet port 16. In this manner, it is obvious that the displacement movement of the switch piston 20 in response to the predetermined differential between the magnitudes of the input fluid pressures $P_1$, $P_2$ disables the metering piston 41 obviating any metering effect thereof between the input fluid pressure $P_1$ and the output fluid pressure $P_0$ and effecting an unmetered application of the input fluid pressure $P_1$ to the outlet port 16 wherein the input and output fluid pressures $P_1$, $P_0$ are equal.

In the event that an oppositely directed differential is established between the input fluid pressures $P_1$, $P_2$ due to a malfunction of the split master cylinder, leaks or the like, wherein the magnitude of the supplied fluid pressure $P_2$ exceeds that of the supplied fluid pressure $P_1$ by a predetermined value, the force $P_2$, $A_3$ and the reduced additive force $P_1$, $A_1$ acting on the switch piston 20 will, of course, overcome the opposing reduced force $P_1$, $A_2$ acting thereon to move said switch piston from its centered position toward its rightward displaced position since the reduction of the supplied fluid pressure $P_1$ effects a corresponding reduction in the opposing forces $P_1$, $A_2$, $P_1$, $A_1$. This rightward displacement of the switch piston 20 engages the rightward end 25 thereof with the plug member 6 which defines the rightward displaced position of said switch piston, and the rightward movement of said switch piston also moves the cam surface 31 thereof rightwardly toward a position driving the switch member 26 upwardly thereon against the compressive force of the switch spring 40 to engage the contact 39 with the interior end of the terminal 35 which completes the circuit to energize the driver warning or dash lamp, as mentioned hereinbefore.

Referring now to FIG. 3, another control valve, indicated generally at 101, is provided having substantially the same component parts and functioning in substantially the same manner as the previously described control valve 1 with the following exceptions.

In the control valve 101, the leftward end 23 of the switch piston 20 is slidably received in the housing bore 103, and a counterbore 108 is connected between the housing bore and counterbore 103, 13 defining a housing shoulder 111 therebetween. The metering piston 41 is slidably received in the counterbore 108 wherein the metering piston peripheral seal 42 defines the effective area $A_5$, and the rightward end portion 112 of said metering piston which defines an abutment for driven engagement with the switch piston 20 is stepped or reduced and slidably received in the housing bore 103, said reduced end portion 112 having a peripheral seal 113 therein in sealing engagement with the housing bore 103 and defining the effective area $A_4$ on said metering piston respective to input fluid pressure in the intermediate chamber 158 which is defined in said housing bore between said metering piston and the switch piston 20. The metering piston counterbore 48 extends through the metering piston reduced portion 112 to connect with the intermediate chamber 158.

Referring now to FIG. 4, another control valve, indicated generally at 201, is provided having substantially the same component parts and functioning in substantially the same manner as the previously described control valves 1, 101 with the following exceptions.

The switch piston 20 of the control valve 201 is the same as those previously described except that the axial passage 29 is omitted and an axially extending abutment 202 is provided on the leftward or driving end 23 of said switch piston 20 for driving engagement with the reduced end 112 of the metering piston 41; and a plurality of cross-passages 203 are provided in said abutment 202 to permit the passage of pressure fluid from the intermediate chamber 158 into the metering piston counterbore 48 when said switch piston abutment 201 is drivingly engaged with said metering piston reduced end 112. To complete the description of the control valve 201, a connecting port 204 is provided in the housing 2 intersecting with the housing bore 103 between the switch and metering pistons 20, 41 in open pressure fluid communication with the intermediate chamber 158, and it should be noted that the connecting port 204 is adapted to be connected with the same fluid pressure generating chamber of the split master cylinder (not shown) as is the inlet port 7.

Referring now to FIG. 5, another control valve, indicated generally at 301, is shown having substantially the same component parts and functioning in substantially the same manner as the prevously described control valve 1 with the following exceptions.

In the control valve 301, the metering piston 41 is provided with an effective area $A_6$ opposed to the area $A_4$ thereof and subjected to the applied fluid pressure at the output port 16, and the area $A_6$ is predeterminately greater than the area $A_2$ of the switch piston 20 while the area $A_4$ is substantially equal to the area $A_1$ of said switch piston. Therefore, when the input and output fluid pressures $P_1$, $P_0$ attain the predetermined value U, as shown by the line OU in the graphical representation of FIG. 2, the piston 41 is moved from its disabled position to its operative position wherein the valve member 43 is actuated to interrupt pressure fluid communication between the inlet and outlet ports 7, 16, as previously described. It is, of course, apparent that the predetermined value U is less than the predetermined value R for the control valve 1 since the area $A_6$ is larger than the area $A_5$. Further, since the ratio between the areas $A_4$, $A_6$ of the control valve 301 is greater than that between the areas $A_4$, $A_5$ of the control valve 1, it is obvious that predetermined increases in the input fluid pressure $P_1$ in excess of the predetermined value U will effect a lesser output fluid pressure $P_0$, as illustrated by the line UV in FIG. 2.

Spaced grooves 302, 303 defining an annular land 304 therebetween are provided on the switch piston 20 between the seals 22, 24 thereof, said land normally being centered in the housing bore 3 beneath the housing cross-bore 18. An electrical switch, indicated generally at 305, includes a conductive closure or plug member 306 threadedly and conductively received in the housing cross-counterbore 19, and a metal terminal 307 extends through said plug member and is insulated therefrom, said terminal having an exterior end for connection in an electrical circuit of a type well known in the art for selectively energizing a driver warning or dash lamp (not shown). A nonconductive switch member 308 is slidably received in a bore 309 provided in the plug member 306, said switch member having a follower end portion 310 extending through the housing cross-bore 18 into engagement with the switch piston land 304 and having a conductive contact 311 on the upper end thereof for electrical engagement with another contact 312 on said plug member and normally spaced therefrom. A current carrying spring 313 is interposed between the interior end of the terminal 307 and the switch member contact 311. When the switch piston 20 is displaced toward its opposed displaced positions, the land 304 is, of course, moved from beneath the housing cross-bore 18, and the force of the switch spring 313 drives the switch member follower end 310 into locking engagement with one of the grooves 302 or 303 and also moves the contact 311 into electrical engagement with the contact 312 to complete the electrical circuit and energize the dash lamp (not shown). The locking engagement between the switch member follower end 310 and grooves 302, 303 prevents the return of the switch piston 20 to its centered position until the switch 305 is removed from the control valve 301. To recenter the switch piston 20 upon removal of the switch 305, opposed centering springs 314, 315 having substantially equal compressive forces are contained between the housing shoulder 5 and the switch piston shoulder 28 and between the housing closure plug 6 and the switch piston end 25. It should also be noted that the opposed pre-compressive forces of centering springs 314, 315 obviates displacement movement of switch piston 20 to its displaced positions in response to differentials between the supplied fluid pressures $P_1$, $P_2$ less than the predetermined value.

From the foregoing, it is now apparent that novel control valves 1, 101, 201 and 301 meeting the objects set forth hereinbefore, as well as other objects and advantages, are provided and that changes as to the precise configurations, shapes, details and connections of the constructions set forth in the disclosure by way of illustration may be made by those skilled in the art without departing from the spirit of the invention.

The embodiments of the invention in which an exclusive property or privilege is claimed are defined as follows:

1. A control valve comprising a housing, piston means movable in said housing in one and other directions between a substantially centered position and opposed displaced positions including opposed end portions, flange means on one of said opposed end portions and defining therewith a first area for subjection to one of separate fluid pressures applied to said housing, a second area on said flange means opposed to and less than said first area for subjection to the other of the separate fluid pressures applied to said housing, the other of said end portions defining a third area substantially equal to the difference between said first and second areas for subjection to said one separate applied fluid pressure, said third area being opposed to said first area and additive to said second area, said piston means being movable in the one and opposite directions from the centered position to the opposed displaced positions thereof upon the establishment of oppositely directed differential forces in excess of a predetermined value between the magnitude of the one separate applied fluid pressure acting on said first and third areas and that of the other separate applied fluid pressure acting on said second area, respectively, and means in said housing for limited displacement preventing engagement with said piston means to oppose movement thereof from its centered position toward its opposed displaced positions when the oppositely directed differential forces are less than the predetermined value.

2. A control valve comprising a housing having a pair of ports therein, piston means displaceable in said housing between said ports and defining opposed areas respectively responsive to separate established fluid pressures at said ports, said piston means including extension means slidable in said housing and defining another area additive to one of said opposed areas and opposed to the other of said opposed areas, and passage means connecting said other area in pressure fluid communication with one of said ports, said piston means being displaceable toward said one port and the other of said ports in response to oppositely directed differential forces in excess of a predetermined value created by the established fluid pressure at said one port acting on one of said opposed areas and said other area and the established fluid pressure at the other of said ports acting on the other of said opposed areas, respectively, and means in said housing for limited displacement preventing engagement with said piston means to oppose displacement thereof toward said one and other ports in response to the oppositely directed differential forces less than the predetermined value.

3. A control valve comprising a housing having a bore and counterbore therein, a pair of spaced ports in said housing connected with said counterbore, piston means movable in said housing in one and opposite directions from a substantially centered position toward opposed displaced positions including a first member slidable in said counterbore between said ports, a first end portion on said first member defining a first effective area subjected to established fluid pressure at one of said ports, a second end portion on said first member opposed to said first end portion and defining a second effective area subjected to established fluid pressure at the other of said ports, said second effective area being less than said first effective area, a second member slidable in said bore and connected with said second end portion of said first member in said counterbore, said second member having a third end portion in said bore defining a third effective area opposed and additive to said first and second effective areas, respectively, and substantially equal to the difference between said first and second effective areas, and passage means connected between said first and third end portions for subjecting said third effective area to the established fluid pressure at said one port, said piston means being movable in the one and opposite directions from its centered position toward its opposed displaced positions upon the establishment of oppositely directed differential forces in excess of a pretermined value created by the established fluid pressure at said one port acting on said first and third effective areas and the established fluid pressure at said other port acting on said second area, respectively, and other means in said housing for limited displacement preventing engagement with said piston means to oppose the movement thereof from its centered position upon the establishment of the oppositely directed forces less than the predetermined value.

4. A control valve comprising a housing, means movable in said housing in oppoiste directions from a substantially centered position toward opposed displaced positions, said means defining with said housing first, second and third chambers, said first and second chambers being subjected to separate fluid pressures, first and second opposed areas on said means in said first and second chambers, respectively, a third area on said means and in said third chamber, said third area being substantially equal to the difference between said first and second areas and additive to one of said first and second areas, and other means connecting said third chamber in pressure fluid communication with one of said first and second chambers, said first named means being movable in the opposite directions toward its opposed displaced positions in response to oppositely acting differential forces established between the magnitude of one separate fluid pressure in said one of said first and second chambers and said third chamber acting on said one of said first and second areas and said third area and the magnitude of another separate fluid pressure in the other of said first and second chambers acting on the other of said first and second areas, respectively.

5. A control valve comprising a housing, first means displaceable in said housing and normally subjected to substantially equal and oppoiste fluid pressures separately supplied to said housing, and second means movable in said housing in response to one of the separate supplied fluid pressures to effect a metered application thereof through said housing, said first means being displaceable upon the subjection thereof to a differential in excess of a predetermined value between the separately supplied fluid pressures to disable said second means and thereby effect an unmetered application of the one supplied fluid pressure through said housing.

6. A control valve comprising a housing, a pair of means relatively displaceable in said housing for controlling the application through said housing of fluid pressure supplied thereto, one of said means being displaceable in response to fluid pressure supplied to said housing to effect a metered application thereof through said housing, and the other of said means being displaceable in response to the force of the supplied fluid pressure acting thereon to drive said one means toward a position in said housing and effect an unmetered application therethrough of the supplied fluid pressure upon the failure of another fluid pressure separately supplied to said housing and also acting on said other means, the other supplied fluid pressure normally establishing another force substantially equal and opposite to said first named force to prevent the driving displacement of said other means.

7. A control valve comprising a housing, means in said housing defining passage means therethrough for fluid pressure supplied to said housing including movable means for controlling the application of the supplied fluid pressure through said passage means, and other means displaceable in response to the force of the supplied fluid pressure acting thereon to engage and cocnertedly drive said movable means toward a position effecting the application through said passage means of the supplied fluid pressure upon the failure of another fluid pressure separately supplied to said housing and acting on said other means, said other supplied fluid pressure normally establishing another force substantially equal and opposite to said first named force to prevent displacement of said other means into driving engagement with said movable means.

8. A control valve comprising a housing, means movable in said housing from a normal operating position in opposite directions toward opposed displaced positions, opposed effective areas on said means respectively subjected to separate fluid pressures supplied to said housing, said means being movable in the opposite directions toward its opposed displaced positions in response to oppositely directed forces upon the occurrence of a predetermined differential between the separate fluid pressures acting on said opposed areas, respectively, other means movable in said housing in response to one of the supplied fluid pressures to effect a metered application thereof through said housing, and a pair of spaced abutment means on said first named and other means, respectively, one of said abutment means being drivingly engaged with the other thereof upon the displacement movement of said first named means toward one of its displaced positions to concertedly drive said other means toward a disabled position in said housing to effect an unmetered application therethrough of the one supplied fluid pressure.

9. The control valve according to claim 8, wherein said other means comprises resiliently urged means having other opposed effective areas respectively subjected to the one supplied fluid pressure and the applied fluid pressure, said resiliently urged means being movable to effect a metered increase in the applied fluid pressure when its own force and the additive force of the one supplied fluid pressure acting on one of said other opposed areas exceeds that of the applied fluid pressure acting on the other of said other opposed areas.

10. The control valve according to claim 8, wherein said other means comprises resiliently urged means normally urged toward the disabled position in said housing to permit the unmetered application therethrough of the one supplied fluid pressure, other opposed effective areas on said resiliently urged means respectively responsive to the applied and one supplied fluid pressures, said resiliently urged means being movable against its own force and the additive input force of the one supplied fluid pressure acting on one of said other opposed areas toward another position in said housing isolating the applied and one supplied fluid pressures in response to the output force of the applied fluid pressure acting on the other of said other opposed areas when the applied and one supplied fluid pressures attain a predetermined value, and said resiliently urged means being thereafter further movable toward a metering position in said housing in response to a predetermined increase in the magnitude of the one supplied fluid pressure in excess of the predetermined value to effect the metered application thereof through said housing and an increase in the magnitude of the applied fluid pressure.

11. The control valve according to claim 10, wherein said other of said other opposed areas is predeterminately greater than said one of said other opposed areas, the increase of the magnitude of the applied fluid pressure in excess of the predetermined value with respect to the predetermined increase of the one supplied fluid pressure being substantially equal to the ratio of the output force to the additive input force and force of said resiliently urged means.

12. The control valve according to claim 10, comprising a bore and counterbore in said housing, said resiliently urged means including piston means slidable in said bore and extending into said counterbore, third abutment means on said housing in said counterbore, resilient means in said counterbore urging said piston means to its disabled position in engagement with said third abutment means, passage means in said piston means between said housing bore and counterbore, a valve seat on said piston means in circumscribing relation with said passage means, and valve means movable in said piston means for engagement with said valve seat including a resiliently urged portion extending through said passage means and having an abutment end normally engaged with said third abutment means to displace said valve means from engagement with said valve seat when said piston means is in the disabled position, said other opposed areas being on said piston means and respectively responsive to the one supplied fluid pressure in said housing bore and the applied fluid pressure in said housing counterbore, respectively, said valve seat being movable into engagement with said valve means to close said passage means and thereafter disengage said abutment end from said counterbore end wall upon the movement of said piston means from the disabled position toward the fluid pressure isolating position when the output force exceeds the additive force of said resilient means and the input force respectively acting on said piston means, and fourth abutment means on said housing for engagement with said piston means and to limit movement thereof in the direction toward the fluid pressure isolating position, said piston means being subsequently movable toward the metering position in response to the predetermined increase of the magnitude of the one supplied fluid pressure to initially re-engage said abutment end with said third abutment means and thereafter disengage said valve seat from said valve seat from said valve means to open said passage means and effect the metered application therethrough of the one supplied fluid pressure to increase the magnitude of the applied fluid pressure.

13. The control valve according to claim 8, comprising input and output chambers in said housing for subjection to the one supplied fluid pressure and the applied fluid pressure, respectively, said other means including piston means movable in said housing between said chambers, said other opposed areas being on said piston means and responsive to the one supplied and applied fluid pressures in said chambers, respectively, resilient means in said output chamber and urging said piston means toward the disabled position into engagement with a portion of said housing in said output chamber, a connecting passage in said piston means between said chambers including a valve seat, valve means for engagement with said valve seat including a resiliently urged portion engaged with another portion of said housing in said output chamber when said piston means is in the disabled position to normally urge said valve means toward an open position disengaged from said valve seat and establishing pressure fluid communication through said connecting passage between said chambers when the one supplied fluid pressure is less than the predetermined value, said piston means being movable toward the fluid pressure isolating position when the output force exceeds the opposing additive force of said resilient means and the input force acting thereon to initially engage said valve seat with said valve means closing said connecting passage and isolating said chambers and thereafter disengage said resiliently urged portion from said other housing portion, and means on said housing for abutment with said piston means and defining the fluid pressure isolating position thereof, said piston means being movable to the metering position upon the predetermined increase of the magnitude of the one supplied fluid pressure in excess of the predetermined value to initially re-engage said resiliently urged portion with said other housing portion and thereafter disengage said valve seat from said valve means to open said connecting passage and establish metered pressure fluid communication between said chambers and thereby effect the metered increase in the magnitude of the applied fluid pressure.

14. The control valve according to claim 8, comprising means for opposing displacement movement of said first named means toward its opposed displaced position when the difference between the magnitudes of said supplied fluid pressures is less than the predetermined differential.

15. The control valve according to claim 14, wherein said last named means comprises a pair of spaced cam means on said first named means, and resiliently urged means engaged with said first named means between said cam means, the displacement movement of said first named means in one of the opposite directions drivingly engaging one of said cam means with said resiliently urged means to effect movement thereof against its own force in opposition to the displacement movement.

16. The control valve according to claim 14, wherein said last named means includes opposed resilient means contained between said housing and said first named means, respectively.

17. The control valve according to claim 8, comprising a third effective area on said first named means additive to one of said opposed areas, the other of said opposed areas and said third area being subjected to the one supplied fluid pressure and said one opposed area being subjected to the other supplied fluid pressure, and said first named means being movable toward its one displaced position into driving engagement with said other means in response to the displacement force of the one supplied fluid pressure acting on said one opposed area and said third area when the magnitude of the one supplied fluid pressure exceeds that of the other supplied fluid pressure by the value of the predetermined differential.

18. The control valve according to claim 17, wherein said other opposed area is predeterminately larger than said one opposed area and said third area is substantially equal to the difference between said one and other opposed areas.

19. The control valve according to claim 17, comprising opposed end portions on said first named means respectively defining said other opposed area and said third area, the one opposed end portion defining said third area also including said one abutment means for driving engagement with the other abutment means of said other means, passage means in said first named means between said opposed end portions for passing the one supplied fluid pressure therethrough to said other means, and means on said first named means intermediate said opposed end portions defining said one opposed area.

20. The control valve according to claim 17, wherein said first named means defines with said housing a pair of opposed chambers respectively subjected to the one and other supplied fluid pressures, said opposed areas on said first named means being in said opposed chambers, respectively, another chamber in said housing defined between said first named means and other means for subjection to said one supplied fluid pressure, said third area being in said other chamber, and means providing passage of the one supplied fluid pressure in one of said opposed chambers to said last named other chamber.

21. The control valve according to claim 17, comprising first and second opposed end portions on said first named means respectively defining said other opposed area and said third area, another portion on said first named means intermediate said first and second end portions and defining said one opposed area, said first opposed end portion and said other portion defining with said housing first and second opposed chambers subjected to the one and other supplied fluid pressures, respectively, and a third chamber in said housing defined between said second opposed end portion and said other means and subjected to said one supplied fluid pressure, said second opposed end portion including said one abutment means in said third chamber.

22. The control valve according to claim 21, wherein said second opposed end portion is movable in said other means and defines therewith said third chamber, and passage means in said first named means between said first and third chambers.

23. The control valve according to claim 21, comprising means for connecting said first and third chambers in open pressure fluid communication, a fourth chamber in said housing for subjection to the applied fluid pressure, and said other means including resiliently urged means movable in said housing between said third and fourth chambers to control the metered application of the one supplied fluid pressure from said third chamber to said fourth chamber, and other opposed effective areas on said resiliently urged means responsive to the one supplied fluid pressure in said third chamber and the applied fluid pressure in said fourth chamber, respectively, said resiliently urged means being movable to effect a metered increase in the applied fluid pressure when its own force and the additive force of the one supplied fluid pressure acting on one of said other opposed areas in said third chamber exceeds the opposing force of the applied fluid pressure acting on the other of said other opposed areas in said fourth chamber, said other abutment means being provided on said resiliently urged means in said third chamber for driven engagement with said one abutment means upon the displacement movement of said first named means toward its one displaced position to drive said resiliently urged means toward the disabled position.

24. The control valve according to claim 21, comprising means for connecting said first and third chambers in open pressure fluid communication, a fourth chamber in said housing for subjection to the applied fluid pressure, and said other means including resiliently urged means movable in said housing between said third and fourth chambers for controlling the metered application of the one supplied fluid pressure from said third chamber to said fourth chamber and normally urged toward the disabled position to permit open pressure fluid communication between said third and fourth chambers, and other opposed effective areas on said resiliently urged means responsive to the applied fluid pressure in said fourth chamber and the one supplied fluid pressure in said third chamber, respectively, said resiliently urged means being movable against its own force and the additive input force of the one supplied fluid pressure in said third chamber acting on one of said other opposed areas toward another position in said housing interrupting pressure fluid communication between said third and fourth chambers in response to the output force of the applied fluid pressure in said fourth chamber acting on the other of said other opposed areas when the applied and one supplied fluid pressures attain a predetermined value, said resiliently urged means being thereafter further movable in response to a predetermined increase in the magnitude of the one supplied fluid pressure in excess of the predetermined value toward a metering position establishing metered pressure fluid communication between said third and fourth chambers and effecting a metered increase in the magnitude of the applied fluid pressure in said fourth chamber, said other abutment means being on said resiliently urged means in said third chamber, and the displacement movement of said first named means toward its one opposed position engaging said one and other abutment means to concertedly drive said resiliently urged means from the other position thereof against the output force to the disabled position.

25. The control valve according to claim 24, wherein said second opposed end portion is movable in said resiliently urged means and defines therewith said third chamber, and said means for connecting said first and third chambers in open pressure fluid communication comprises passage means in said first named means and connected between said first and second end portions.

26. The control valve according to claim 24, wherein said other of said other opposed areas is predeterminately greater than said one of said other opposed areas, the increase in the magnitude of the applied fluid pressure in excess of the predetermined value with respect to the predetermined increase of the one supplied fluid pressure in excess of the predetermined value being substantially equal to the ratio of the output force to the additive input force and force of said resiliently urged means.

27. The control valve according to claim 25, wherein said other of said other opposed areas is substantially equal to said other of said first named opposed areas and said one of said other opposed areas is substantially equal to said third area.

28. The control valve according to claim 25, wherein said other of said other opposed areas is predeterminately greater than said other of said first named opposed areas and said one of said other opposed areas is substantially equal to said third area.

29. The control valve according to claim 24, wherein said resiliently urged means includes piston means movable in said housing between said third and fourth chambers, said one and other of said other opposed areas being on said piston means in said third and fourth chambers, respectively, said second end portion of said first named means being movable in said piston means and defining therewith said third chamber, resilient means in said fourth chamber urging said piston means toward the disabled position into engagement with a portion of said housing in said fourth chamber, a connecting passage in said piston means between said third and fourth chambers including a valve seat, valve means for engagement with said valve seat including a resiliently urged portion engaged with said housing portion when said piston means is in the disabled position to normally urge said valve means toward an open position disengaged from said valve seat and establishing open pressure fluid communication through said connecting passage between said third and fourth chambers, said piston means being movable toward the other position in said housing and against said resilient means to store the energy of the compressive force thereof when the output force exceeds the opposing additive compressive force of said resilient means and the input force to initially engage said valve seat with said valve means closing said connecting passage and interrupting pressure fluid communication between said third and fourth chambers and thereafter disengage said resiliently urged portion of said valve means from said housing portion, and means on said housing for engagement with said piston means to limit movement thereof in the direction toward the other position, said piston means also being subsequently movable from engagement with said last named means toward the metering position in response to the stored energy of said resilient means and the predetermined increase in the magnitude of the one supplied fluid pressure in excess of the predetermined value to initially re-engage said resiliently urged portion of said valve means with said housing portion and thereafter disengage said valve seat from said valve means to establish the metered pressure fluid communication between said third and fourth chambers through said connecting passage and thereby effect the metered increase in the magnitude of the applied fluid pressure.

30. A control valve comprising a housing having a bore therein interposed between a counterbore and a pair of stepped counterbores, a pair of spaced input ports in said housing connected with said first named counterbore for simultaneous subjection to established fluid pressures normally having substantially equal magnitudes, respectively, an output port in said housing connected with the larger of said stepped counterbores, first piston means slidable in said bore in one and opposite directions from a substantially centered position toward opposed displaced positions including a first end portion extending into the smaller of said stepped counterbores and defining a first effective area, enlarged flange means slidable in said first named counterbore between said input ports, said flange means defining a second end portion having a second effective area opposed to said first effective area and subjected to the established fluid pressure at one of said input ports, said second area being predeterminately greater than said first area, a third effective area on said flange means opposed to said second area and subjected to the established fluid pressure at the other of said input ports, said third area being substantially equal to the difference between said first and second areas, and passage means connected between said first and second end portions for subjecting said first effective area to the established fluid pressure at said one input port, said first piston means being movable in the one and opposite directions toward its opposed displaced positions upon the establishment of oppositely directed forces in response to a predetermined differential between the magnitude of the established fluid pressure at said one input port acting on said first and second areas and that of the established fluid pressure at said other input port acting on said third area, other means in said housing for limited displacement preventing engagement with said first piston means to oppose the movement thereof from its centered position toward its opposed displaced positions when the differential between the magnitudes of the established fluid pressures at said one and other input ports is less than the predetermined value, second piston means slidable in said smaller stepped counterbore and extending into said larger stepped counterbore, first abutment means on said housing in said larger stepped counterbore, a spring in said larger stepped counterbore, a spring in said larger stepped counterbore contained between said housing and said second piston means and having a force normally urging said second piston means toward a disable position in engagement with said first abutment means, said second piston means including a first counterbore, said first end portion of said first piston means being slidable in said first counterbore and said passage means being connected in open pressure fluid communication with said first counterbore, second abutment means in said first counterbore for engagement with said first end portion of said first piston means and spaced therefrom, a second counterbore in pressure fluid communication with said larger stepped bore, another bore connected between said first and second counterbore, a valve seat in circumscribing relation with said other bore and facing said first counterbore, and fourth and fifth opposed effective areas respectively responsive to the established fluid pressure at said one input port and to the output fluid pressure at said output port, said fifth area being predeterminately larger than said fourth area, valve means in said first counterbore for engagement with said valve seat, a resiliently urged stem portion on said valve means extending through said other bore and second counterbore into engagement with said first abutment means when said second piston means is in its disabled position to normally displace said valve means from engagement with said valve seat and establish open pressure fluid communication between said one input port and said output port, said second piston means being movable from its disabled position against the spring force and the additive input force of the established fluid pressure at said one input force acting on said fourth area toward another position in said housing in response to the output force of the established fluid pressure at said output port acting on said fifth area when the fluid pressures at said one input port and said output port exceed a predetermined value, the movement of said second piston means toward its other position initially engaging said valve seat with said valve means to interrupt pressure fluid communication between said one input port and said output port and thereafter disengaging said stem portion from said first abutment means, means on said housing defining third abutment means for engagement with said second piston means to limit its movement in the direction toward its other position, said second piston means also being movable from engagement with said second abutment means and against said output force in response to a predetermined increase in the established fluid pressure at said one input port in excess of the predetermined value acting on said fourth area and the additive spring force toward a metering position in said housing to initially re-engage said stem portion with said first abutment means and thereafter disengage said valve seat from said valve means to establish metered pressure fluid communicaion between said one input port and said output port and effect a metered increase in the established fluid pressure at said output port and a corresponding increase in the output force, said second piston means also being subsequently movable from its metering position towards its other position and into re-engagement with said third abutment means to actuate said valve means and again interrupt pressure fluid communication between said one input port and said output port when the increased output force attains a value great enough to overcome the opposing additive input and spring forces, and said first piston means being movable in one of the one and opposite directions toward one of its opposed displaced positions when the magnitude of the established fluid pressure at said one input port acting on said first and second area exceeds that of the established fluid pressure at said other input port acting on said third area by the predetermined differential value to engage said first end portion thereof with said second abutment means and thereafter concertedly drive said second piston means toward its disabled position to again actuate said valve means and established open pressure fluid communication between said one input port and said output port.

31. A control valve comprising a housing having a pair of spaced abutment portions thereon, piston means movable in said housing and having a pair of opposed end portions for engagement with said abutment portions, respectively, said piston means defining in said housing a pair of opposed chambers adjacent to said opposed end portions thereof, a pair of opposed effective areas on said piston means respectively responsive to the established fluid pressures in said chambers, resilient means in one of said chambers normally urging one of said opposed end portions into abutment with one of said abutment portions, passage means in said piston means and connected between said opposed end portions, a valve seat on said piston means in circumscribing relation with said passage means, and valve means for engagement with said valve seat including a resiliently urged stem portion extending through said passage means into engagement with a portion of said housing in said one chamber to normally disengage said valve means from said valve seat and effect open pressure fluid communication between said chambers, said piston means being movable to engage the other of said opposed end portions with the other of said abutment portions against the force of said resilient means and the established fluid pressure in the other of said chambers acting on one of the areas in response to the established fluid pressure in said one chamber acting on the other of said areas when the established fluid pressures in said chambers attain a predetermined value to initially engage said valve seat with said valve means interrupting pressure fluid communication between said chambers and thereafter disengage said resiliently urged portion from said housing portion, and said piston means being subsequently movable toward a position in said housing establishing metered pressure fluid communication between said chambers in response to a predetermined increase in the established fluid pressure acting on said one area in said other chamber in excess of the predetermined value to initially re-engage said resiliently urged portion with said housing portion and thereafter disengage said valve seat from said valve means to effect a metered increase in the established fluid pressure in said one chamber in excess of the predetermined value.

References Cited

UNITED STATES PATENTS

| | | | |
|---|---|---|---|
| 2,195,214 | 3/1940 | Jacob | 303—84 |
| 3,162,491 | 12/1964 | Van Winsen | 303—22 X |
| 3,169,800 | 2/1965 | Oberthur | 303—22 |
| 3,191,614 | 6/1965 | Feibush | 303—84 X |
| 3,374,322 | 3/1968 | Miller | 303—84 X |

MILTON BUCHLER, Primary Examiner

JOHN J. McLAUGHLIN, Jr., Assistant Examiner

U.S. Cl. X.R.

60—54.5; 92—138; 137—87; 188—151; 200—82; 303—84